United States Patent [19]

Bullinga

[11] 4,177,509
[45] Dec. 4, 1979

[54] SELF-EXCITED INVERTER WITH SUPPRESSED CURRENT SPIKES

[75] Inventor: Johannes Bullinga, Cedar Rapids, Iowa

[73] Assignee: Rockwell International Corporation, El Segundo, Calif.

[21] Appl. No.: 955,277

[22] Filed: Oct. 26, 1978

[51] Int. Cl.² ............................................. H02M 7/537
[52] U.S. Cl. ................................. 363/133; 331/113 A
[58] Field of Search .............. 331/113 A; 363/23, 55, 363/56, 133

[56] References Cited

U.S. PATENT DOCUMENTS

| | | | |
|---|---|---|---|
| 2,852,730 | 9/1958 | Magnuski | 363/22 |
| 3,092,786 | 6/1963 | Bayne | 363/133 X |
| 3,403,319 | 9/1968 | Tate | 331/113 A |
| 3,417,348 | 12/1968 | Moore | 363/133 X |
| 3,473,104 | 10/1969 | Tate | 363/133 |
| 3,660,749 | 5/1972 | Kadri | 363/23 |

Primary Examiner—William M. Shoop
Attorney, Agent, or Firm—Terry M. Blackwood; Richard A. Bachand; H. Frederick Hamann

[57] ABSTRACT

A free-running inverter preventing excessive current spikes comprises a transformer and a switch means for alternately connecting, and then disconnecting, a DC voltage to a transformer primary winding which encloses a parallel combination of a saturating magnetic core and a non-saturating magnetic core. A transformer feedback winding enclosing only the saturating core drives the switch means during and between switch states. Switching between states is accomplished prior to saturation of the composite core.

14 Claims, 5 Drawing Figures

SELF-EXCITED INVERTER WITH SUPPRESSED CURRENT SPIKES

This invention relates to electrical power conversion and more particularly to free-running inverters.

An inverter conventionally comprises a saturable magnetic core transformer and a switch system for alternately applying DC voltage to a primary winding of said transformer and then removing same therefrom. Also, in practically all inverters, the primary winding is center tapped and each winding half is driven by one of a pair of switches operating in push-pull fashion. The time varying magnetic flux which is then generated in the transformer core induces potentials in the secondary winding which causes an alternating current to flow in the load connected to the secondary.

A well known disadvantage of such inverters is that of high current spike generation when the transformer core saturates. Various means have been employed in the art to, in one way or another, anticipate core saturation and to turn off the on switch at or prior to the occurrence of core saturation. Several such schemes are somewhat complex either in regard to transformer construction and/or the switching system and/or the switch control system. See for instance the free-running or self-excited inverters disclosed in U.S. Pat. Nos. 3,541,428 and 3,638,099. Also see the synchronized or externally driven inverters disclosed in U.S. Pat. Nos. 3,383,582 and 3,660,751.

The present invention is featured in the provision of improved self-excited inverter circuitry which reduces the aforementioned current spikes and whose form is simplified in some respects relative to prior art embodiments.

These and other features, objects and advantages of the invention will become more apparent upon reference to the following specifications, claims and appended drawings in which:

Figure 1A:
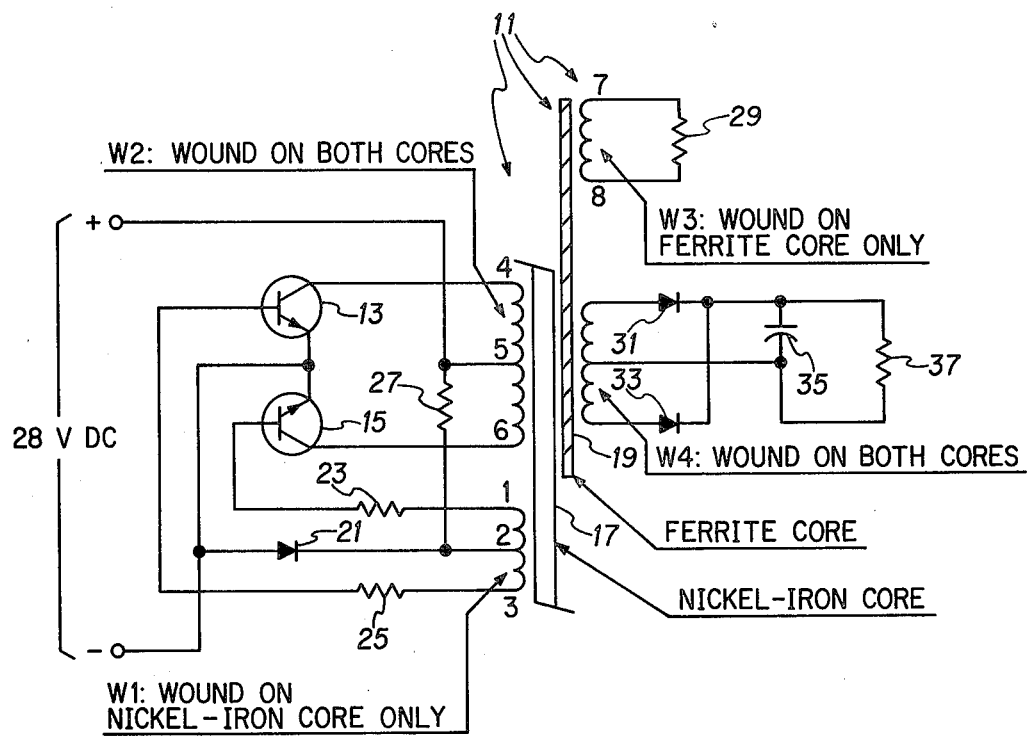
FIG. 1a is a circuit schematic showing a first presently preferred embodiment.

Turning now to FIG. 1a, the inverter illustrated therein comprises a transformer 11 and a pair of switches 13 and 15 for applying 28 volts DC first to one half and then the other of the primary winding of transformer 11. Transformer 11 has two uncut toroidal cores 17 and 19. Core 17 is a nickel-iron core whose relative permeability ranges from about 50,000 to 300,000. Core 19 is a ferrite core whose relative permeability ranges from about 300 to 1,000. The two cores have similar inner and outer diameters but differ in axial thickness such that the cross-sectional area of ferrite core 19 is approximately one-third of the cross-sectional area of nickel-iron core 17.

Figure 1B:
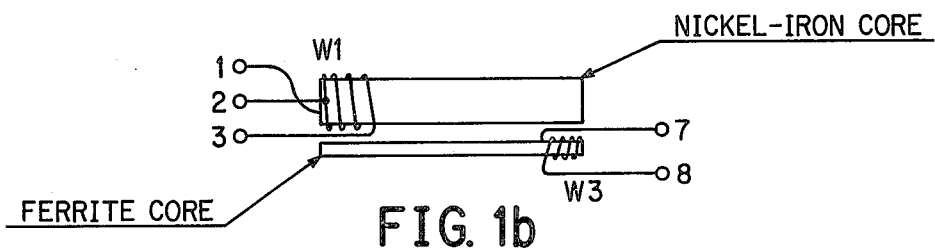
FIGS. 1b and 1c are respectively somewhat simplified side and top views of the transformer cores of FIG. 1a and show certain relationships between transformer windings.
Figure 1C:
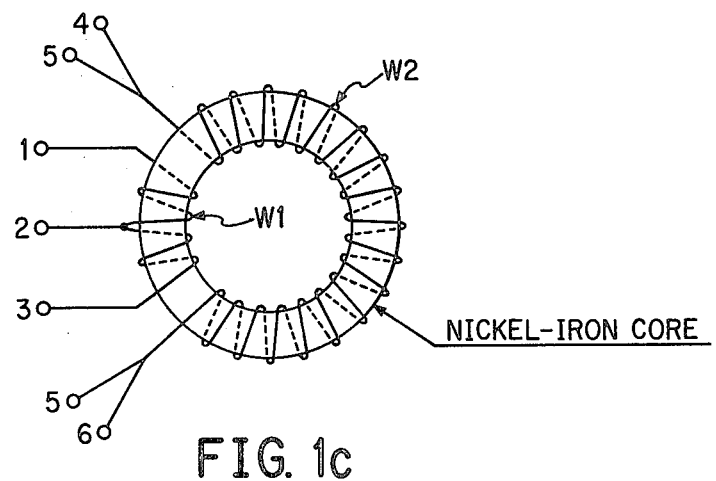

Both center tapped primary winding W2 and center tapped secondary winding W4 are bifilar wound around the coaxially stacked combination of the two cores. Center tapped feedback winding W1 is wound so as to enclose only the iron-core 17 and is angularly displaced around the toroid relative to W2 so that neither of W1 or W2 is wound over the other. Winding W3 is wound to enclose only the ferrite core 19. FIG. 1b illustrates the relationship between W1 and W3. Windings W2 and W4 are omitted from FIG. 1b for clarity. FIG. 1c illustrates the relationship of angular displacement (i.e., the preferred spatial separation) between W1 and W2.

Each of the switches 13 and 15 comprises a transistor having its emitter connected to its mates' emitter, to the negative 28 volt DC terminal, and, through a diode 21, to the center tap 2 of winding W1. The two transistor collectors are connected respectively to opposite ends 4 and 6 of primary winding W2 and the two transistor bases are connected respectively through separate 22 ohm resistors 23 and 25 to opposite ends 1 and 3 of center tapped feedback winding W1. The center tap 5 of primary winding W2 is connected to the positive 28 volt DC terminal and through a 5 Kilohm starting resistor 27 to the center tap 2 of winding W1. Winding W3 is parallel connected with a 22 ohm resistor 29. Secondary winding W4 feeds rectifying diodes 31 and 33, storage capacitor 35 and load 37.

Figure 2:
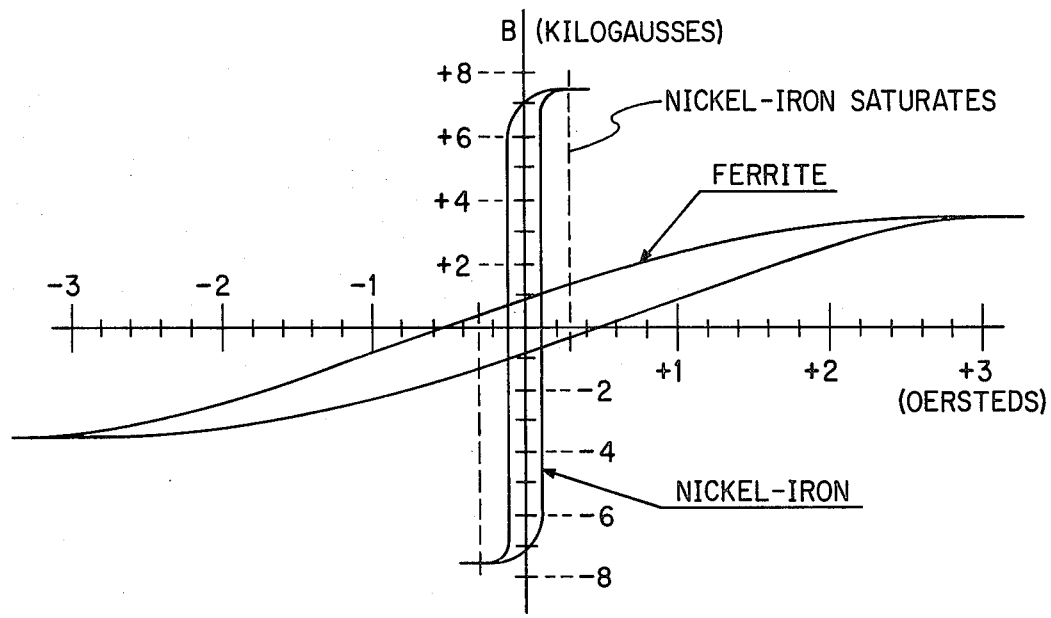
FIG. 2 shows hysteresis curves for the FIG. 1a core materials.

FIG. 2 illustrates the relationship between the hysteresis loops of the two FIG. 1a core materials at 10 kHz. As indicated by these curves the nickel-iron core saturates at a considerably lesser magnetizing force than the ferrite core.

In operation, one of the FIG. 1a transistors 13 or 15 will initially switch on, and the other one off, either as a result of a slight but inherent unbalance in the circuitry or as a result of the application of some external starting impetus. Assuming then that transistor 13 is on (i.e., is effecting essentially zero impedance between its collector and emitter) and that transistor 15 is off (i.e., is effecting a very high impedance between its collector and emitter) the 28 v DC is applied across the top half of primary winding W2 and current flows in said top half of W2. Due to the different hysteresis characteristics as shown in FIG. 2, and the cross-sectional area difference of the two cores, the current-induced magnetic flux of the nickel-iron core support practically all the primary winding voltage until the nickel-iron core is near saturation. Thus, prior to saturation of the nickel-iron core, voltage is induced not only in secondary winding W4 but also in feedback-drive winding W1. The polarity of the voltage in winding W1, the current supply capability of W1, and the connections from W1 to transistors 13 and 15, are appropriate and sufficient to hold the on transistor on and the off transistor off and to drive the transistors from on to off and vice versa. When the nickel-iron core becomes saturated any further magnetic flux increase is supported by the ferrite core which is still far from saturation. However, the base drive winding W1 is wound around the nickel-iron core only and therefore the transistors lose their base drive and shut off any further exitation of the transformer when the nickel-iron core saturates. In the shut off mode, the reactance of the primary winding is relatively high due to the low reluctance path provided by the unsaturated ferrite core which, in turn, limits the exitation current. Hence an excessive current spike at the end of each half cycle is prevented. Entering the succeeding half cycle, the drive voltage from W1 turns transistor 15 on and transistor 13 off and the above process is basically repeated.

It should be pointed out that the turning off of the on transistor is effected by the feedback drive winding W1 which encloses only the saturated core. As will be pointed out hereinbelow, an aiding voltage from winding W3 may be employed to speed-up the turnoff time of the on transistor. However, feedback drive winding W1 is capable of effecting the turnoff by itself.

It should also be noted that winding W3 and the parallel connected 22 ohm resistor 29 are not necessary but are highly preferred because such combination has the function to increase the effective reluctance path of the ferrite core about the same amount as the base drive current does to the effective reluctance of the nickel-iron core. Briefly, flux divides among parallel flux paths in inverse proportion to the path reluctances. Thus the winding W3 and its 22 ohm resistor combination prevents too large a portion of the total flux from being bled off or shunted into the ferrite core path and thus ensures that enough of the total flux remains in the iron core to induce in winding W1 sufficient base drive current for transistors 13 and 15.

Figure 3:
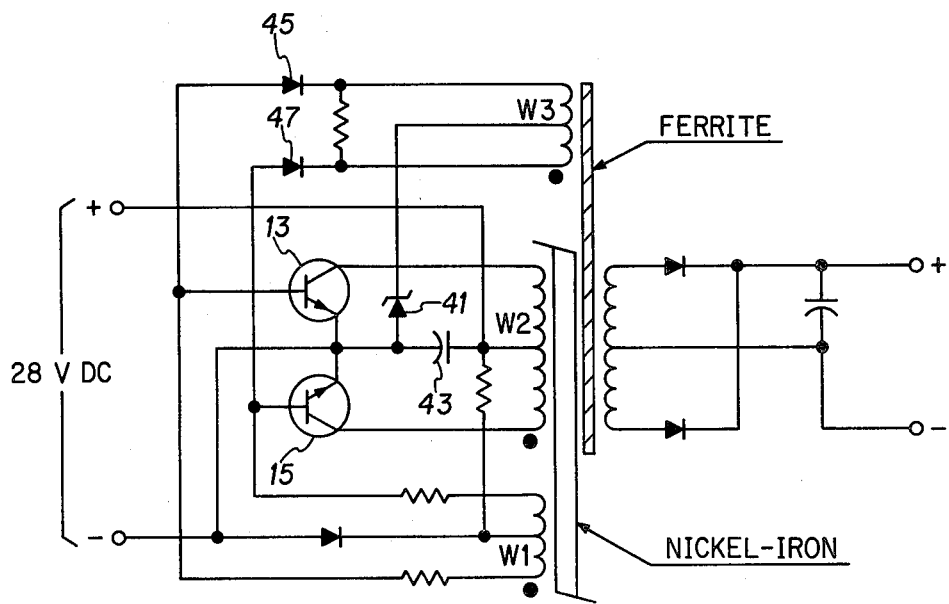
FIG. 3 is a circuit schematic showing a second presently preferred embodiment.

The apparatus of FIG. 3 includes an improvement on the FIG. 1 circuitry which aids in turning off the transistors and further decreases the current spike amplitude. More particularly, winding W3 is center tapped and said center tap is connected to the cathode of a 5.1 volt zener diode 41. The anode of said zener is connected to the emitters of transistors 13 and 15 and through a capacitor 43 to the center tap of winding W2. The ends of winding W3 are respectively connected each via a different one of diodes 45 or 47 to the bases of transistors 13 and 15. The remaining circuitry is identical to that in FIG. 1a. Also, the relative polarity of the windings in FIG. 3 are indicated in the conventional manner by dots adjacent the windings.

In operation, whereas the base drive voltage decreases near the end of each half cycle (i.e., when the nickel-iron core saturates), the feedback voltage developed in the ferrite core winding W3 increases. Because the two voltages are of opposite polarity, the base current reverses near the end of each half cycle. This enables the transistors to shut off a few microseconds sooner and before the nickel-iron core is totally saturated. The negative base current also shortens the storage time of the transistors significantly. The result is a still lower current spike than the one obtained in the circuitry of FIG. 1.

Further exemplary of preferred but non-essential details are the particular core materials employed. It is of course essential than one core saturate at a lower magnetizing force than the other. However, it is merely preferred that one core saturate at a magnetizing force which is substantially lower than the other core, and it is merely highly preferred that one core saturate at a magnetizing force which is at least ten times lower than the other core.

Thus, while various embodiments of the present invention have been shown and/or described, it is apparent that changes and modifications may be made therein without departing from the invention in its broader aspects. The aim of the appended claims, therefore, it to cover all such changes and modifications as fall within the true spirit and scope of the invention.

What is claimed is:

1. A free-running inverter comprising:
    transformer means comprising (a) first and second magnetic cores, said first core requiring less magnetizing force than the second core to become saturated, (b) a primary first winding wound around both cores, (c) a secondary second winding wound around both cores, and (d) a feedback third winding wound around only said first core, and
    switch means having on and off states for alternately connecting a DC voltage source to said first winding and then, in response to said first core saturation, disallowing said connection,
    said third winding being connected for supplying to said switch means all the voltage or current necessary for driving said switch means between and during its on and off states.

2. A free-running inverter as defined in claim 1 wherein said third winding is spatially separated from said first winding so that neither the first or third winding is wound over the other.

3. A free-running inverter as defined in claim 1 wherein the magnetizing force required to saturate said first core is substantially less than the magnetiziing force required to saturate said second core.

4. A free-running inverter as defined in claim 1 wherein the magnetizing force required to saturate said first core is at least ten times lower than the magnetizing force required to saturate said second core.

5. A free-running inverter as defined in claim 1 wherein said switch means comprises transistor switch means.

6. A free-running inverter as defined in claim 1 wherein said switch means consists of transistor switch means.

7. A free-running inverter as defined in claim 1 wherein said inverter further includes (i) a transformer means fourth winding wound only on said second core, and (ii) resistance means of predetermined resistance value connected in parallel with said fourth winding.

8. A free-running inverter as defined in claim 7 wherein said predetermined resistance value is such as to make the additional effective reluctance resulting from said fourth winding approximately the same as the reluctance resulting from said feedback third winding.

9. A free-running inverter as defined in claim 7 wherein said fourth winding is further connected for aiding the third winding in driving said switch means from the on state to the off state.

10. A free-running inverter as defined in claim 1 wherein said first winding is tapped between its ends so as to comprise two first winding sections, said third winding is tapped between its ends so as to comprise two third winding sections, and said switch means comprises a pair of transistors each having a base connected for receiving a drive current supplied from a different third winding section, and each transistor also having a collector and emitter connected to alternately applying said DC voltage source to one section of said first winding and then to the other first winding section.

11. A free-running inverter as defined in claim 10 and further including (i) a transformer means fourth winding wound only on said second core and (ii) resistance means of predetermined resistance value connected in parallel with said fourth winding.

12. A free-running inverter as defined in claim 11 wherein said fourth winding is tapped between its ends so as to comprise two fourth winding sections and each of said fourth winding sections is connected for supplying additional feedback to a different one of said transistors for aiding said third winding in driving said transistors from their on states to their off states.

13. A free-running inverter as defined in claim 12 wherein said first, third and fourth windings are each center tapped.

14. A free-running inverter as defined in claim 13 wherein said predetermined resistance value is such as to make the additional effective reluctance resulting from said fourth winding approximately the same as the reluctance resulting from said feedback third winding.

* * * * *